Patented Apr. 14, 1942

2,280,031

UNITED STATES PATENT OFFICE 2,280,031

BREAD MAKING

Frederick C. Weber, Eastchester, N. Y., assignor to The Keratene Company, Winsted, Conn., a corporation of Connecticut No Drawing. Application June 29, 1940,
Serial No. 343,169

1 Claim. (Cl. 99—90)

This invention relates to the manufacture of leavened bread and like products, from doughs made with whole wheat flour, bolted white flour, rye flour or Graham flour, or with two or more of these flours.

Heretofore, it has been the practice in the baking industry, particularly in the manufacture of bread, to employ certain inorganic oxidizing salts for their effect on the maturing or aging of the dough during yeast fermentation, thereby obtaining well recognized improvements in the product as well as effecting economies in manufacture.

I have found that incorporation of the amino-acid cystine, a white or nearly white crystalline organic material, in relatively small amounts, with the bread-making ingredients effects the generally desired improvements in the resultant bread to a remarkable degree, and that these improvements are obtained even when the so-called "rich" formulas are followed.

In addition to affording advantages in respect to volume, crust color, interior color, texture, aroma and flavor, the process of the invention shortens the time of fermentation to bring the dough to the proper maturity, or reduces the amounts of sugar and yeast required, or both. As regards rapidity in aging, maturing, or softening of the dough, the use of cystine is particularly advantageous with flours made from hard wheat and with flours made from wheat which has grown during protracted periods of drought.

Among the points of superiority of the amino-acid material over the inorganic oxidizing salts is the total absence of chemical odor which is frequently noticeable in bread made with these oxidizing salts. Furthermore, whereas the inorganic oxidizing salts used as "dough conditioners" or "bread improvers" are devoid of food value, cystine even in very small amount has a definite nutritional value. For example, cystine is particularly adapted as an amino-acid supplement to milk proteins (casein) when this protein material is present at a low dietary level.

The invention is equally applicable to the manufacture of bread by the sponge process and by the straight dough process.

In the commercial application of the invention, the amino-acid material, cystine, is employed, in either process, in the proportion of .056 ounce to .084 ounce, to 100 pounds of flour (approximately 1 part cystine to 20,000–30,000 parts of flour).

The material in the proportions indicated, which are not critical, is added to the ingredients for constituting the dough at the beginning of either the sponge process or the straight dough process, and the batch is thoroughly mixed to secure uniform incorporation throughout. The cystine material may be mixed with a portion, or the entire quantity, of water to be used in the batch, allowing, if desired, a short period of time, about 15 minutes, with occasional stirring, to effect solution; or solution may be readily brought about at a temperature of 35°–40° C. Equally good results are obtainable whether or not the cystine material has been brought into solution before incorporating it with the dough batch ingredients.

After incorporation of the cystine material with the water, yeast, flour, and other ingredients of the dough, further treatment, such as fermentation, proofing, etc., is conducted according to customary practice.

What I claim as new is:

The process of making leavened bread, which comprises incorporating cystine with the ingredients of the dough batch, and fermenting the batch.

FREDERICK C. WEBER.